(12) United States Patent
Granda et al.

(10) Patent No.: US 6,571,739 B2
(45) Date of Patent: Jun. 3, 2003

(54) AVIARY

(75) Inventors: Thomas J. Granda, Haiku, HI (US); William L. Little, Kinei, HI (US)

(73) Assignee: No. 9 Welding and Metal Sales, Inc., Maui, HI (US)

( * ) Notice: Subject to any disclaimer, the term of this patent is extended or adjusted under 35 U.S.C. 154(b) by 0 days.

(21) Appl. No.: 09/851,266

(22) Filed: May 9, 2001

(65) Prior Publication Data

US 2002/0020361 A1 Feb. 21, 2002

Related U.S. Application Data

(60) Provisional application No. 60/202,769, filed on May 9, 2000, and provisional application No. 60/205,464, filed on Aug. 8, 2000.

(51) Int. Cl.[7] .............................................. A01K 31/06
(52) U.S. Cl. ...................................... 119/459; 119/469
(58) Field of Search ................................. 119/459, 482, 119/487, 416, 417, 428, 427, 429, 461, 485, 531, 532; D30/114, 119; 52/101, 169, 79.1, 79.4, 79.6

(56) References Cited

U.S. PATENT DOCUMENTS

| | | | | | |
|---|---|---|---|---|---|
| 3,744,455 | A | * | 7/1973 | Fowler | 119/474 |
| D274,152 | S | | 6/1984 | Fleming | D30/4 |
| 4,930,445 | A | * | 6/1990 | Chestnut | 119/485 |
| 5,000,121 | A | * | 3/1991 | Daily | 119/461 |
| D336,556 | S | | 6/1993 | Payne et al. | D30/133 |
| D340,321 | S | * | 10/1993 | Bonn | D30/114 |
| 5,347,769 | A | * | 9/1994 | Dinsmore | 52/101 |
| D357,558 | S | | 4/1995 | Johnson | D30/114 |
| 5,448,964 | A | | 9/1995 | Takimoto | 119/17 |
| D379,681 | S | | 6/1997 | Barman | D30/110 |
| 5,755,064 | A | * | 5/1998 | Meyer et al. | 52/174 |
| 5,878,537 | A | * | 3/1999 | Flischel | 52/101 |
| D409,339 | S | | 5/1999 | Silano et al. | D30/124 |
| 5,996,536 | A | | 12/1999 | King | 119/459 |
| 6,024,047 | A | | 2/2000 | Hoogland | 119/51.03 |
| 6,125,595 | A | * | 10/2000 | Showalter | 119/57.9 |
| 6,129,052 | A | * | 10/2000 | Huang | 119/461 |
| 6,226,932 | B1 | * | 5/2001 | Friedrich | 52/79.1 |
| 6,295,784 | B1 | * | 10/2001 | Richard | 52/741.15 |
| 6,324,801 | B1 | * | 12/2001 | Holfman et al. | 52/299 |
| 6,341,459 | B1 | * | 1/2002 | Bates et al. | 52/299 |
| 6,347,487 | B1 | * | 2/2002 | Davis | 52/1 |
| 6,449,920 | B1 | * | 9/2002 | Richard | 52/741.15 |

FOREIGN PATENT DOCUMENTS

| | | | |
|---|---|---|---|
| DK | 28 19688 | * | 11/1979 |
| FR | 2342652 | * | 3/1976 |
| FR | 2786982 | * | 12/1998 |

* cited by examiner

*Primary Examiner*—Charles T. Jordan
*Assistant Examiner*—Judith A. Nelson
(74) *Attorney, Agent, or Firm*—Dykema Gossett PLLC

(57) ABSTRACT

An aviary for housing animals having a floor, a plurality of side walls and a ceiling forming at least one main room and a vestibule separate from the main room. The vestibule has at least two doors, one interior door and one exterior door, that allow people to enter and leave the aviary while keeping the animals securely housed within the main room, away from the exterior door of the aviary. The aviary has at least one footing with a pest shroud for keeping rodents and the like from climbing the footing up to the aviary.

14 Claims, 6 Drawing Sheets

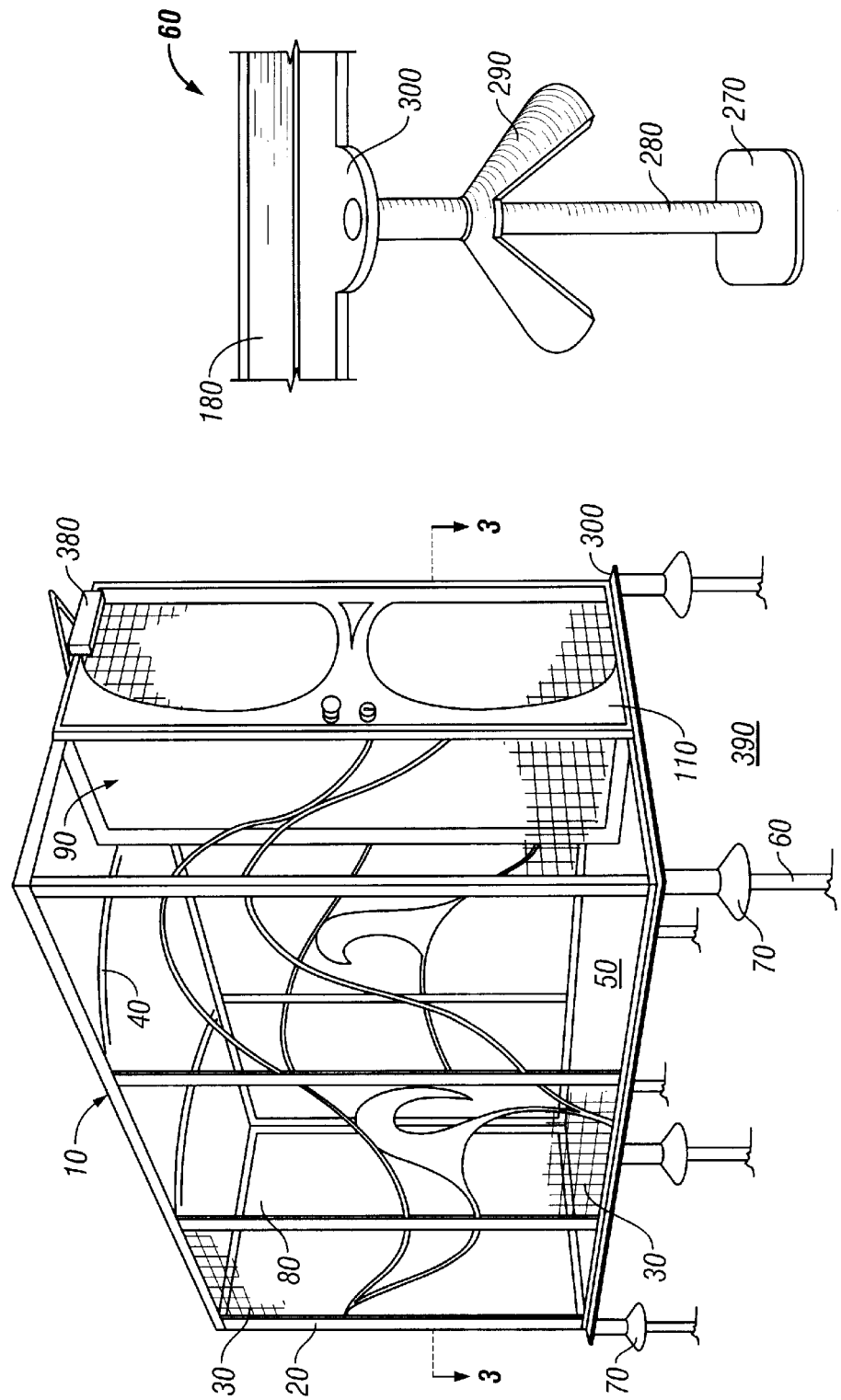

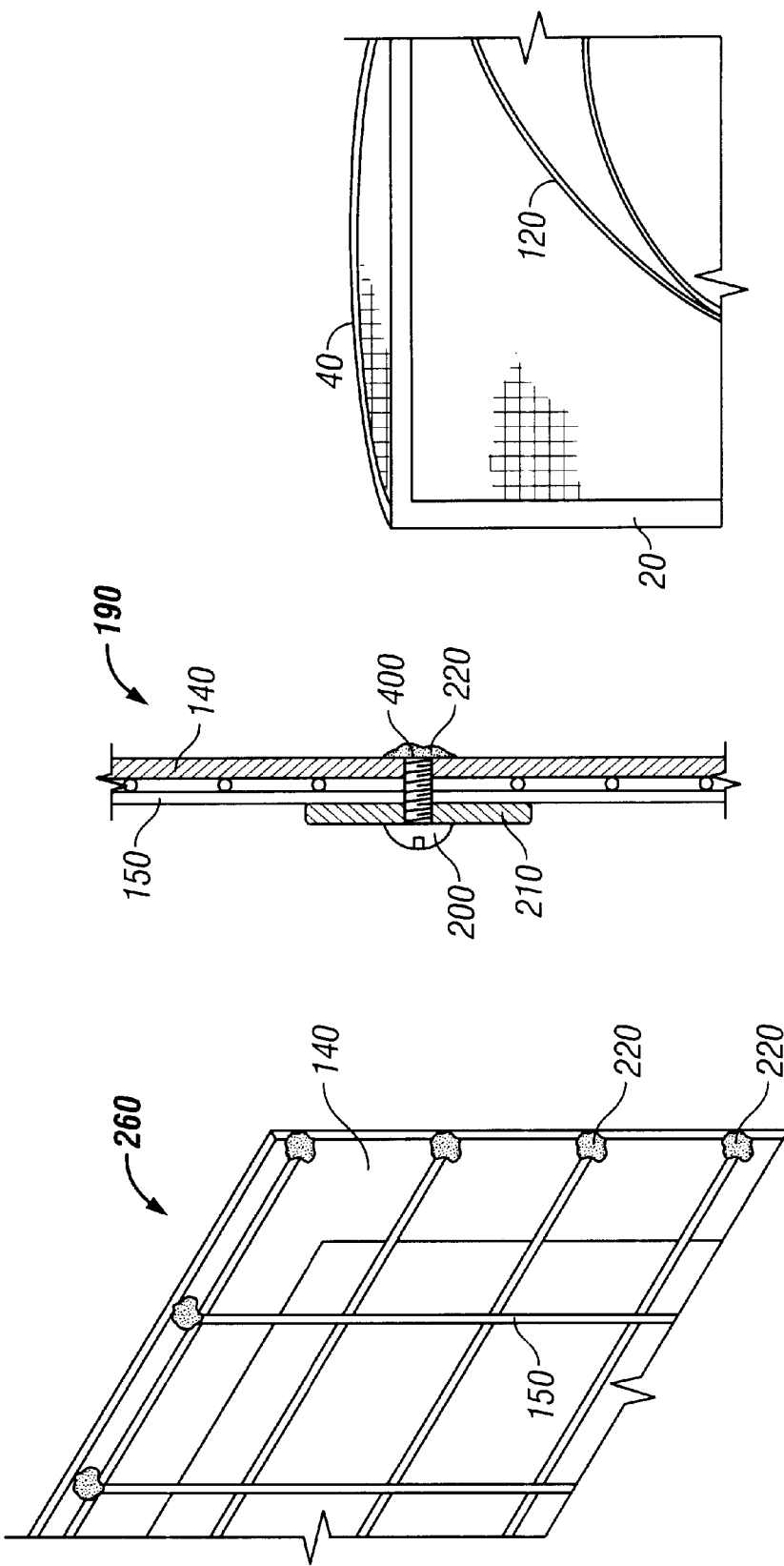

AVIARY

CROSS-REFERENCE TO RELATED APPLICATIONS

This application claims the benefit of U.S. Provisional Application No. 60/202,769, filed May 9, 2000 and U.S. Provisional Application No. 60/205,464, filed Aug. 8, 2000.

BACKGROUND OF THE INVENTION

This invention relates to an aviary for housing animals, and more particularly to an aviary having a main room and a separate vestibule with an interior door and an exterior door that allow ingress and egress to the aviary without permitting the housed animals access to the exterior door.

It is common in the construction of cages, especially bird aviaries, to have a single room with a single door allowing access to the interior of the cage. This type of cage is illustrated in the patent issued to Takimoto (U.S. Pat. No. 5,448,964). In the Takimoto device, the cage is made of wire mesh that is placed within an upper and lower frame. One side of the wire mesh has a single door therein that slides up and down long the wire mesh when opened and closed.

There are actually cages with multiple door construction, such as those of the Barman patent (U.S. Pat. No. Des. 379,681) and the Johnson patent (U.S. Pat. No. Des. 357,558). While there are multiple doors in both of these devices, the cages only have single rooms. Therefore, all the doors open into the same room allowing access to the same area. In both cases, if a person isn't attentive, it is possible for the animal that is housed within the cage to escape from the cage when the door is open as each door opens into the atmosphere surrounding the cage.

The Payne reference (U.S. Pat. No. Des. 336,556) discloses a bird house with a squirrel guard located on the support post. The squirrel guard is for the purpose of preventing squirrels from climbing the pole and entering the bird house. The squirrel guard of the Payne device has a level, flat rim portion that would provide a solid support ledge should an animal manage to reach the ledge which is foreseeable if the Payne device is located near a tree, house or other structure where the squirrel could climb up an adjacent structure and leap to the ledge of the squirrel guard. The squirrel guard of the Payne device would only prevent rodents from climbing up the pole from the ground, but would not deter such progress if they came from an adjacent structure.

All the prior art is for cages of small sizes that are easily managed and movable and all have room for improvement.

SUMMARY OF THE INVENTION

It is an object of the present invention to provide an aviary for housing animals that allows easy access to and from the interior without allowing the animals housed within access to the exterior of the aviary.

Another object of the present invention is to provide an aviary that can be easily manufactured, yet is durable and economical.

To accomplish the task of allowing a person to enter and exit the aviary without allowing the animals housed within the aviary access to the exterior door of the aviary, the present invention is for an aviary having a floor, a plurality of side walls and a ceiling forming at least one main room and a vestibule separate from the main room. The vestibule has at least two doors, one interior door and one exterior door, that allow people to enter and leave the aviary while keeping the animals securely housed within the main room, away from the exterior door of the aviary. The aviary also has at least one footing with a pest shroud for keeping rodents and the like from climbing the footing up to the aviary.

The present aviaries are manufactured using known structural elements such as angle supports, flat bars, wire mesh, welded joints, cotter pins, screws and washers, and bolts in such as manner as to provide a frame construction that is solid and durable.

Other objects, advantages and novel features of the invention will become more apparent from the following detailed description of the invention when taken in conjunction with the accompanying drawings.

BRIEF DESCRIPTION OF THE DRAWINGS

FIG. 1 is a perspective view of a first embodiment of the aviary of the present invention;

FIG. 2 is a partial cross-sectional view of a detail of the legs having pest shrouds;

FIG. 7 is a partial perspective view of a detail of the fastening system of the flat bar supports and wire mesh used in the side walls of the aviary;

FIG. 8 is a partial cross-sectional view of a detail of the side wall fastening system of the flat bar supports and wire mesh used in the side walls of the aviary;

FIG. 9 is a partial side elevational view of a detail of an arched roof;

DETAILED DESCRIPTION OF THE INVENTION

Figure 3:
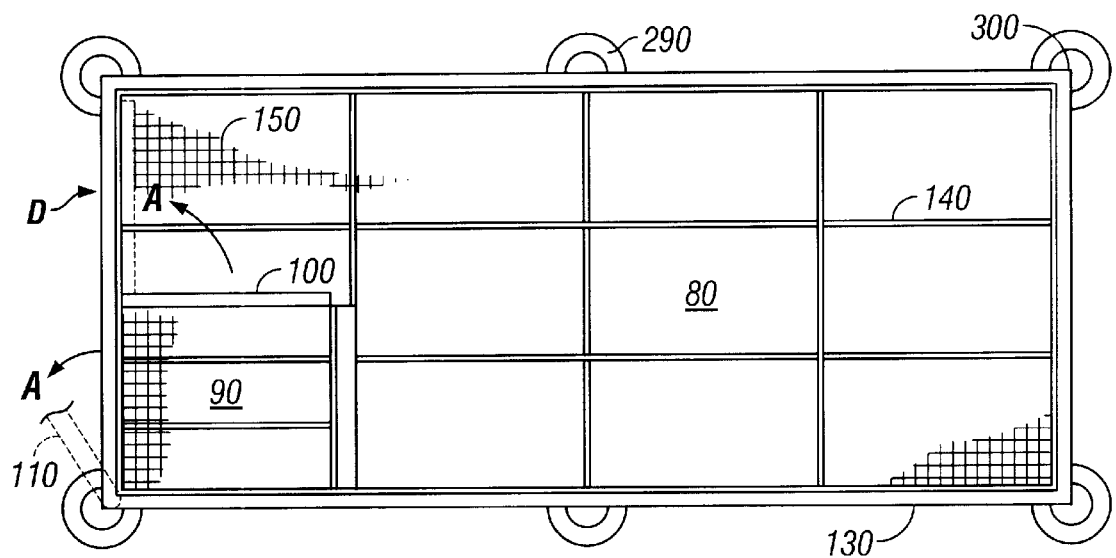
FIG. 3 is a cross-sectional view of the floor of the aviary showing a first version of a double door vestibule, taken along line 3—3 in FIG. 1.

The present invention, as shown in FIG. 1, is for an aviary 10 having a main room 80 and a separate vestibule 90. There is an exterior door 110 that allows access into and out of the vestibule 90 from outside the aviary 10. There is also an interior door 100 (shown in FIG. 3) that allows access into and out of the main room 80 from the vestibule 90. The doors 100, 110 may have an automatic door closer 380 that is mounted on the aviary 10 in such a manner that is unaccessible from the main room 80. The automatic door closer 380 automatically closes the door so that if a person entering or leaving the aviary 10 has their hands occupied, the door 110 will close behind them preventing animals housed within the cage from escaping.

The aviary 10 is made of a frame 20 that connects and supports the roof 40, a plurality of side walls 30 and the floor system 50.

The aviary 10 is raised from its support surface 390 by a plurality of footings 60 that are connected to the frame 20.

As shown in FIG. 2, each footing 60 has a central shaft 280 that is attached to a base 270 at one end and to a leg pad portion 300 of the frame 20 at the opposite end. Located along the shaft 280, in between the base 270 and leg pad 300, is a flange 290 that is used as a pest shroud that prevents vermin, pests and other animals from climbing up the shaft 280 to the aviary 10. The base 270 is illustrated as a square shape, however round, triangular or any other common shape could be used, depending upon the supporting environment upon which it will stand. There may not be a base 270 attached to the shaft 280 at all, but instead the shaft 280 could be sharpened or graduated at one end to allow it to be pushed into a support surface 390 such as grass, dirt or mulch.

The leg pad 300 of the frame 10 extends out farther than the lower flange element of the angle support 180 used to form the frame 10. This extension allows a support pad for the footing 60 to be attached to on the underneath side of the aviary 10. The leg pad 300 extends away from the aviary 10 which facilitates the cleaning of the cage. It is possible to sweep out the aviary 10 or hose it down, which causes the debris within the aviary 10 to fall to the ground, through the wire mesh 150 of the flooring system 50. If the leg pad 300 extended to opposite direction, or toward the interior of the aviary 10, the remains of the cleaning and debris would catch on the leg pad 300 and the lower flange of the angle support 180, requiring further cleaning.

The pest shroud 290 is larger in diameter than the leg pad 300 of the frame 10, as shown in FIG. 3. However, it is foreseeable to have various sized and shaped shrouds 290, depending upon the need.

Each aviary 10 has a separate vestibule 90 that is either located within, as shown in FIG. 3, or adjacent the main room 80 of the aviary 10. The vestibule 90 has at least two doors: at least one interior door 100 and at least one exterior door 110.

The interior door 100 is located on the interior of the aviary 10 and is used to either open or close the opening from the vestibule 90 into the main room 80. In the preferred embodiment, the interior door 100 is connected to the frame 10 with a hinge that allows the interior door 100 to swing in the direction of arrow A into the vestibule. However, if desired, the interior door 100 can swing into the main room 80 of the aviary 10 as well, or even in both directions.

The exterior door 110 is also hinged to the frame 10 and swings in direction of arrow A, and allows for entry into and exit out of the vestibule 90. It is also foreseeable that the doors 100, 110 can be on tracks, allowing them to be raised or lowered, as opposed to being hingedly connected to the frame 20.

By having a double door structure of the vestibule 90, a person can enter into the vestibule 90 through exterior door 110 and shut the exterior door 110 behind them. The person can then open the interior door 100 and enter the main room 80 of the aviary 10 without worrying about the animals inside escaping out into the environment when the interior door 100 is open. If a bird or other animal does escape through the open interior door 100, they will only make it into the vestibule 90 and not to the exterior environment surrounding the aviary 10.

Figure 4:
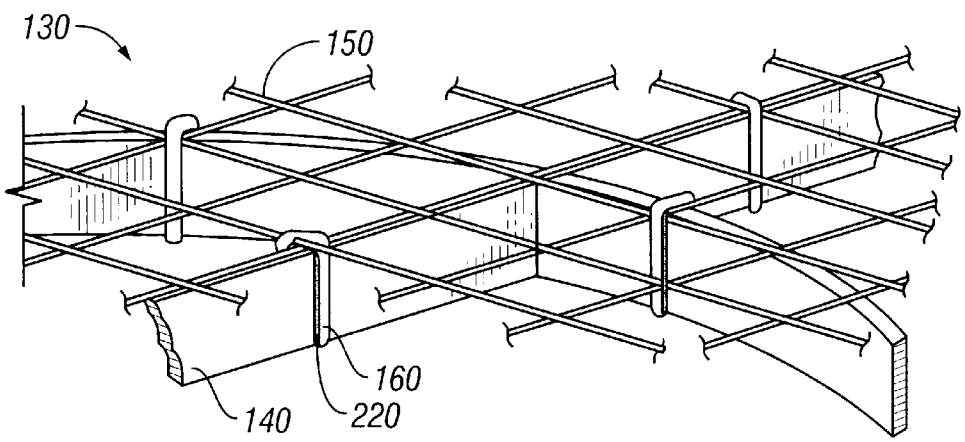
FIG. 4 is a partial perspective view of a detail of the flooring system of the aviary.

The floor system 130 (FIG. 4) is comprised of a series of flat joist supports 140 that are interconnected together to provide a support frame with a wire mesh 150 attached thereto. Other types of flooring, such as solid panels, wood or steel, planks, and etc. are foreseeable, however, the wire mesh 150 is shown in the preferred embodiment because it allows for easy maintenance of the aviary 10.

The wire mesh 150 is intermittently attached to the flat joist supports 140 with a series of connections 160. In the shown embodiment, the connections 160 are cotter pins that have been welded 220 to the flat bar joist supports 140. Other conventional types of flooring such as, but not limited to, wood panels, steel sheets, planks, bars and the like can be used. However, the wire mesh 150 is preferred because it is durable and allows for easy cleaning of the droppings and debris because they can fall through the wire mesh to the underneath side of the aviary 10. Once the droppings and debris fall below the aviary 10, it can easily be swept up and removed. Also, since these aviaries 10 can be used outside, the wire mesh allows for rain, snow and other elements to pass through the aviary 10 without puddling or settling.

Figure 5:
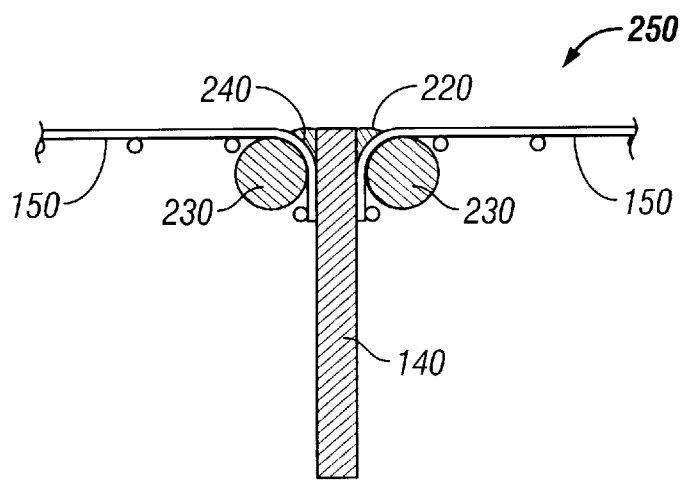
FIG. 5 is a partial perspective view of a detail of the fastening system used in the flooring.

One solution was developed to attach the wire mesh 150 to the floor or flat bar joists 140 used in the flooring system 130. In this solution, as shown in FIG. 5, the flat bar support or floor joist 140 is attached at various places along the frame 20. Each flat bar support 140 has at least two round bar supports 230 located adjacent to it and attached thereto. The wire mesh 150 used in the flooring system 130 is curved 240 around each round bar support 230 and attached, such as being welded 220, to the round bar support 230 as well as the flat bar support 140. This connection provides a strong connection and support system for the aviary 10. It also allows for separate pieces of wire mesh 150 to be joined together, which may be required should the floor size of the aviary 10 exceed the size of the individual sheets of wire mesh 150.

Figure 6:
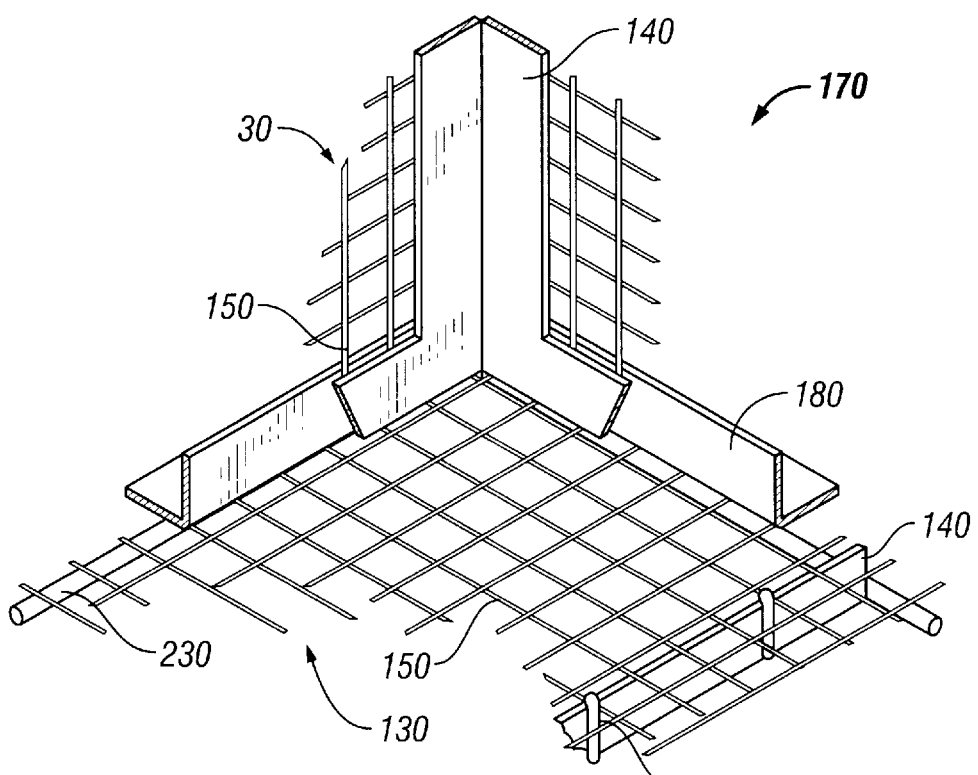
FIG. 6 is a partial perspective view of the corner section of the frame, floor and wire mesh walls in a corner of the aviary.

FIG. 6 illustrates a corner structure 170 of the aviary 10 showing the various structural components used to form the side walls 30 and flooring system 130. The flooring system 130 is made of a series of flat bar supports 140 interconnected as previously illustrated. A plurality of round bar supports 230 are used on the perimeter of the flooring system 130 and attached to the flat bar supports 140. Wire mesh 150 is secured to the top of the flat bar supports 140 and the round bar supports 230 with a plurality of cotter pins 160 as previously described.

Along the outer perimeter, adjacent the round supports 230, angle supports 180 are connected to the flooring system 130. The lower flange of the angle supports 180 are directed away from the interior of the aviary 10 for purposes of cleaning and etc. as previously discussed.

A method of attaching the angles supports 180 to the wire mesh 150 and the round bar supports 230 is by welding them together, however other conventional means are possible, such as bolting, tethering, screwing, or a combination thereof which will be discussed with respect to FIG. 7.

To form the side walls 30 and support for the roof 40, a flat bar support 140 is attached to the angle support 180 with wire mesh 150 placed in between the two supports 140, 180. The flat bar supports 140 help to provide additional strength and support to the frame as well as help to secure the wire mesh 150 to the frame 20 of the aviary 10. This system of flat bar, round bar and angled supports form the frame 20 that is the skeletal structure of the aviary 10.

As shown in FIG. 7, the wire mesh 150 is attached to the flat bar supports 140 through a series of welds 220 along the perimeter of the flat bar support 140. The combination of the wire mesh 150 and the flat bar supports 140 are then attached to the angle supports 180 either by intermittent welds 220 or other commonly known techniques such as screws, adhesives, nails, clips, and the like.

FIG. 8 is an alternative means of attaching the wire mesh 150 to a flat bar support 140, such as in the middle of the side walls 30 of the frame 20. In this connection, the wire mesh 150 is attached to the flat bar support 140 with a combination of a screw, washer 210 and weld 220.

A screw 200 is placed through a washer 210, through a hole in the flat bar support 140 until the end of the screw 200 protrudes through the opposite end of the flat bar support 140. The washer 210 is used to prevent the screw 200 from being pulled through the wire mesh 150 and to securely hold the wire mesh 150 between the screw 200 and the flat bar support 140. The tip 400 of the screw 200 is welded 220 to the flat bar support 140 thereby securing the screw 200 and ultimately the wire mesh 140 in place adjacent the flat bar support 140.

Figure 10:
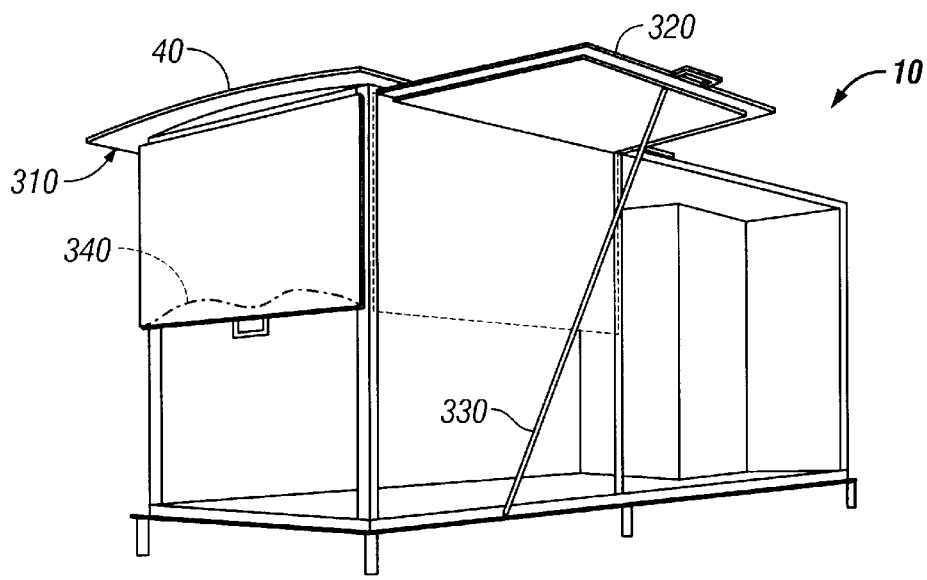
FIG. 10 is a perspective view of the aviary showing movable side panels.

The aviary 10 as shown in FIGS. 1 and 9 have a curved roof 40 which allows for more space within the aviary 10. The roof 40 is generally made of the same wire mesh 150 as the rest of the structure and attached to the frame 20 with the same means as the side walls 30 and floor 50 are attached to the frame 20. However, it is also possible for the roof 40 to be made of a solid sheet of material so as to easy deflect the elements such as rain, snow and falling leaves. Such solid materials could be one of sheet metal, fiberglass, wood or the like, but is not limited thereto. The roof 40 can also be flat, have ribs, be hipped, have peaks and/or follow most any conventional type of roofing. The flat or arched roof 40 (FIG. 9) are the most economical as their construction is consistent with that of the rest of the structure. They may also extend out past the ends of the frame 20, as shown in FIG. 10, so as to provide a protective overhang 310.

Some features that are both architecturally pleasing and functional can be added to the aviary 10 thereby making the overall structure both aesthetically pleasing as well as adding strength to the support frame 20.

Movable panels 320 can be added around the top periphery of the aviary 10 so as to provide protection to the housed animals. The panels 320 are connected to the frame 20 by hinges so that they may be raised or lowered, depending upon the situation. FIG. 10 illustrates panels in both the raised and lowered positions. The panels 320 are supported by a rod support 330 when in the raised position. These panels can also have hydraulic lifts attached thereto to retain them in a desire position. The panels may also be attached to the frame 20 via a track system wherein they are raised of lowered within the track system.

Figure 11:
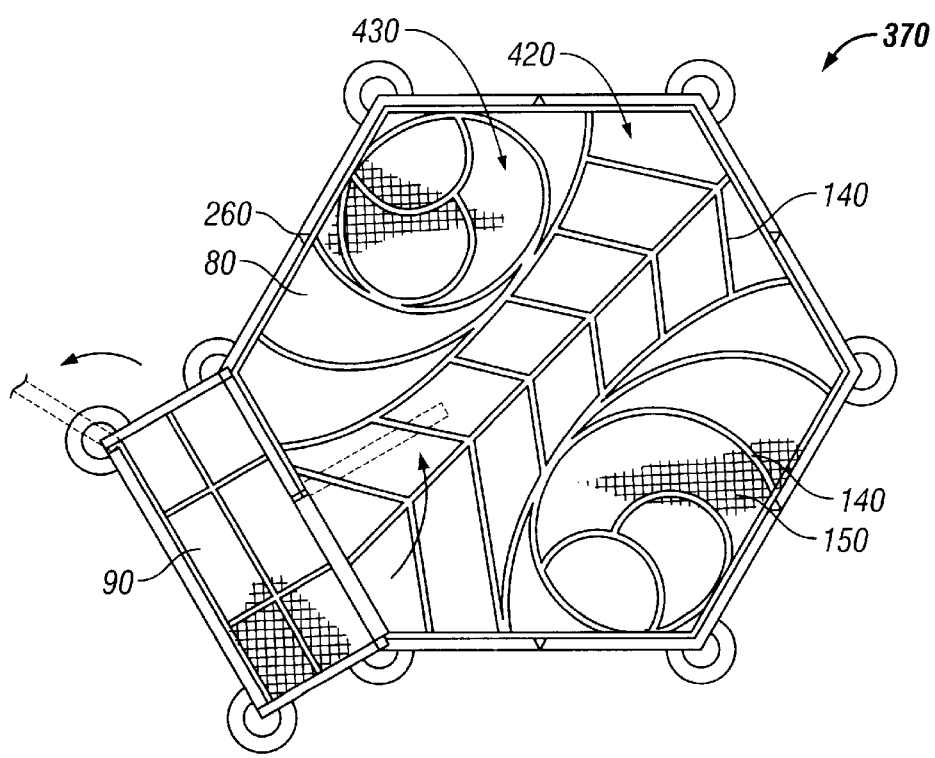
FIG. 11 is a cross-sectional view of the floor system of a second embodiment of the aviary of the present invention.

A second embodiment of the aviary 10 is shown in FIG. 11. This aviary 10 has a hexagonal shaped main room 80 with a rectangular shaped vestibule 90 attached to one side thereof. In this embodiment, the decorative and structural nature of the flat bar supports 140 is illustrated. The decorative nature of the serpentine central walkway 420 surrounded by the swirling side wings 430 in the main room 80 are the support elements for the floor 50 within the main room 80, as well as they are decorative adding character and a uniqueness to the aviary 10. These supports 140 can be arranged in various shapes and are not limited to only those illustrated in FIG. 11.

Figure 12:
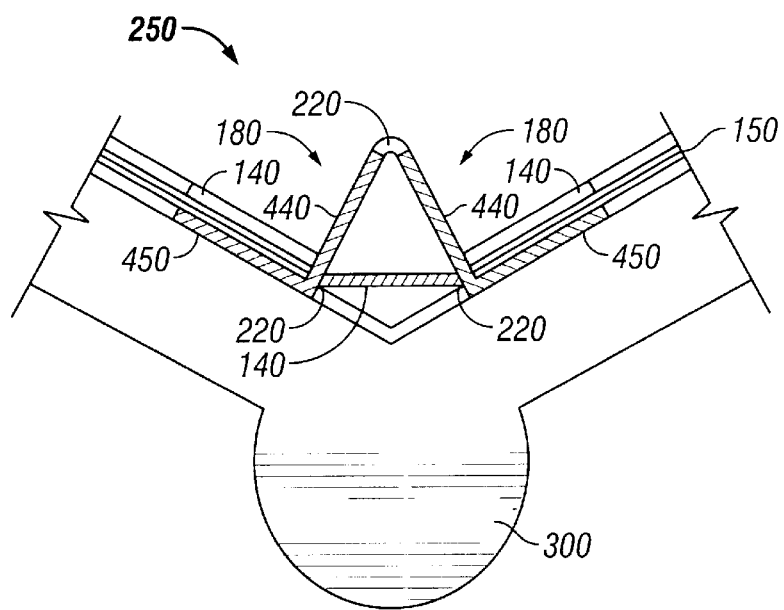
FIG. 12 is a cross-sectional view of a detail of a corner framing section of the second embodiment of the aviary.

This second embodiment of the aviary 10, as shown in FIG. 11 has an alternative to the corner framing 170 than that as shown in FIG. 6. As illustrated in FIG. 12, the corner detail 250 of the second embodiment actually uses two angle supports 180 that are placed at an angle from one another, with a flat bar support 140 bridging the gap between the two angle supports 180. All three supports are connected together at the joints with welds 220 thereby forming a triangular cross-section between the protruding flanges 440 of the angle supports 180 and the flat bar support 140. Another flat bar support 140 is located adjacent to and connect to the other flange 450 of each angle support 180. The wire mesh 150 is connected to and in between the angle flanges 180 and the adjacent flat bar supports 140 forming the side wall 30 of the aviary 10. This corner detail 250 allows for multiple sided aviaries 10 as shown in FIG. 11. The number of sides of the aviary 10 can be changed, depending upon the angle with which the angled supports 180 are connected to one another. That is, the larger the angle, the fewer sides to the aviary; and the smaller the angle, the more sides are needed.

Figure 13:
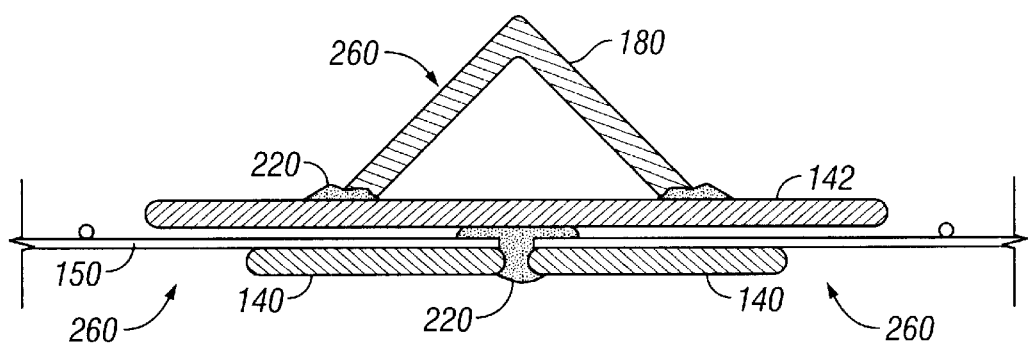
FIG. 13 is a cross-sectional view of a detail of a stiffener for the framing of the second embodiment of the aviary.

The stiffeners 460 that are used to support the side walls 30 in between corner details 250 is shown in detail in FIG. 13. An angle support 180 is used to support connections between the ends of the wire mesh 150 and the ends of the flat rod supports 140. If the side walls 130 are comprised of panels 260, like those shown in FIG. 7, the panels 260 can be assembled together to form the entire wall of the aviary 10. These panels 260 are connected together with a stiffener 460.

The wire mesh 150 is attached to the flat bar supports 140 as previously illustrated in FIG. 7 to form a panel 260. Two panels 260 are placed end-to-end, with or without an angle thereto. The ends of each panel 260 are joined together with a weld 220 while at also being welded to another flat bar support 142 that is wider than the other, adjacent flat bar supports 140. The flat bar supports 140 and the wider flat bar support 142 sandwich the wire mesh 150 therebetween such that when all the flat bar supports 140, 142 are connected together, the wire mesh 150 is held in place therebetween. An angle support 180 is attached to the opposite side of the wider flat bar support 142 by being welded at both ends thereto. This creates a triangular cross-section adding a strength and stiffness to the aviary side walls 130.

Although various embodiments of the invention has been described in detail herein with reference to the accompanying drawings, it is to be understood that the invention is not limited to these precise embodiments, and variants and modifications may be effected therein by one skilled in the art without departing from the scope or spirit of the invention as defined in the appended claims, such as angle supports 180 can be used in lieu of flat bar supports or solid or hollow, tubular shaped supports could be used interchangeably with the flat bar and angle supports.

What is claimed is:

1. An aviary for use in housing animals and supported on a surface, said aviary comprising:

a floor;

a plurality of side walls;

a ceiling;

said floor, plurality of side walls and said ceiling forming a main room and a separate vestibule;

at least one footing for supporting said aviary off the surface, such that there is a predetermined gap between said floor and the surface; and said vestibule having at least two doors;

wherein said vestibule allows a person to enter and leave the aviary while keeping the animals securely housed within the main room of the aviary, and said at least one footing has a pest shroud for keeping animals on the exterior of said aviary from climbing said footing up to the aviary.

2. The aviary as claimed in claim 1, wherein:

said at least two doors are comprised of at least one interior door and at least one exterior door, wherein said exterior door allows the person to enter and exit said vestibule, and said interior door allows the person to enter and exit said main room of said aviary.

3. The aviary as claimed in claim 1, wherein:

said aviary is rectangular in shape.

4. The aviary as claimed in claim 3, wherein:

said vestibule is square in cross-section.

5. The aviary as claimed in claim 1, wherein:

said main room is hexagonal in cross-section.

6. An aviary for housing animals, comprising:

a main room and a vestibule separate from said main room;

said main room and said vestibule comprised of floor, a plurality of side walls and a ceiling;

a plurality of footings, each footing having a pest shroud for keeping other animals from climbing the footing up to the aviary;

said vestibule having at least one interior door and one exterior door;

wherein said vestibule allowing people to enter and leave the aviary while keeping the animals securely housed within the main room, away from the exterior door of the aviary.

7. The aviary as claimed in claim 6, wherein:

said aviary having an arched roof.

8. The aviary as claimed in claim 6, wherein:

said aviary having at least one movable panel attached to said side walls, said movable panel providing protection from the elements.

9. The aviary as claimed in claim 6, wherein:

said aviary has a walkway attached to said floor that provides support to said aviary floor.

10. An aviary for housing animals, comprising:

a frame for supporting a roof, a floor and a plurality of side walls, said side walls arranged to form a main room and a vestibule;

said vestibule having at least two doors;

a plurality of footings for supporting the aviary wherein said all animals entering and leaving the aviary must pass through the vestibule which prevents unnecessary entry into and escape from the aviary.

11. The aviary as claimed in claim 10, wherein:

said frame is made of a plurality of frame elements comprised of flat rod supports, round rod supports and angle supports connected together, and said side walls, roof and floor are made of wire mesh.

12. The aviary as claimed in claim 10, wherein:

said floor and roof are connected to said frame with cotter pins assemblies;

said side walls are connected to said frame with welded screw and washers assemblies; and said side walls are connected to one another with vertical stiffener assemblies.

13. The aviary as claimed in claim 12, wherein:

each of said plurality of footings has a pest shroud for keeping animals on the exterior of said aviary from climbing said footing up to the aviary.

14. The aviary as claimed in claim 13, wherein:

said frame has a plurality of leg pads for connecting said footings to said frame.

* * * * *